United States Patent [19]

Brolin et al.

[11] Patent Number: 4,631,955
[45] Date of Patent: Dec. 30, 1986

[54] ROPE AND SHEAVE TESTING DEVICE AND METHOD

[75] Inventors: Charles A. Brolin, Cedar Rapids; James B. Sheets, Ames; Ryan H. Benson, Cedar Rapids, all of Iowa

[73] Assignee: FMC Corporation, Chicago, Ill.

[21] Appl. No.: 757,566

[22] Filed: Jul. 22, 1985

[51] Int. Cl.[4] ............................................. G01L 5/04
[52] U.S. Cl. ...................................................... 73/158
[58] Field of Search ................ 73/788, 806, 808, 810, 73/811, 812, 816, 826, 830, 834, 837, 858, 432 SD, 7, 158

[56] References Cited

U.S. PATENT DOCUMENTS

| | | | |
|---|---|---|---|
| 4,372,172 | 2/1983 | Gombolz et al. | 73/7 |
| 4,413,513 | 11/1983 | Ross et al. | 73/7 |

FOREIGN PATENT DOCUMENTS

| | | | |
|---|---|---|---|
| 179641 | 11/1982 | Japan | 73/7 |
| 785682 | 12/1980 | U.S.S.R. | 73/7 |
| 894416 | 12/1981 | U.S.S.R. | 73/158 |
| 920436 | 4/1982 | U.S.S.R. | 73/158 |
| 920455 | 4/1982 | U.S.S.R. | 73/808 |
| 1070454 | 1/1984 | U.S.S.R. | 73/7 |

OTHER PUBLICATIONS

SAE Technical Paper No. 790905 entitled: Comparison of Wire Rope Life Using Nylon and Steel Sheaves–Part I, by John H. Chen and C. R. Ursell (1979).
SAE Technical Paper No. 790905 entitled: Comparison of Wire Rope Life Using Nylon and Steel Sheaves–Part II, by John H. Chen and Paul E. Gage (1979).
One p. Polymer Technical Bulletin entitled: Low Temperature Shock Load Testing of Nylatron OSM Sheaves (Dec. 1979).

Primary Examiner—Stewart J. Levy
Assistant Examiner—Robert R. Raevis
Attorney, Agent, or Firm—A. J. Moore; H. M. Stanley; R. B. Megley

[57] ABSTRACT

A method and apparatus for repeatedly testing wire rope and sheaves under simulated operating conditions is disclosed. The testing apparatus is capable of simulating many conditions under which wire ropes and sheaves are used in actual practice with cranes or the like including adjustments for varying rope tension, rope speed, sheave speed, sheave off-lead angles relative to the rope and to allow reverse bending of the rope. Sheaves of different diameter and different rope size and materials may be tested.

33 Claims, 11 Drawing Figures

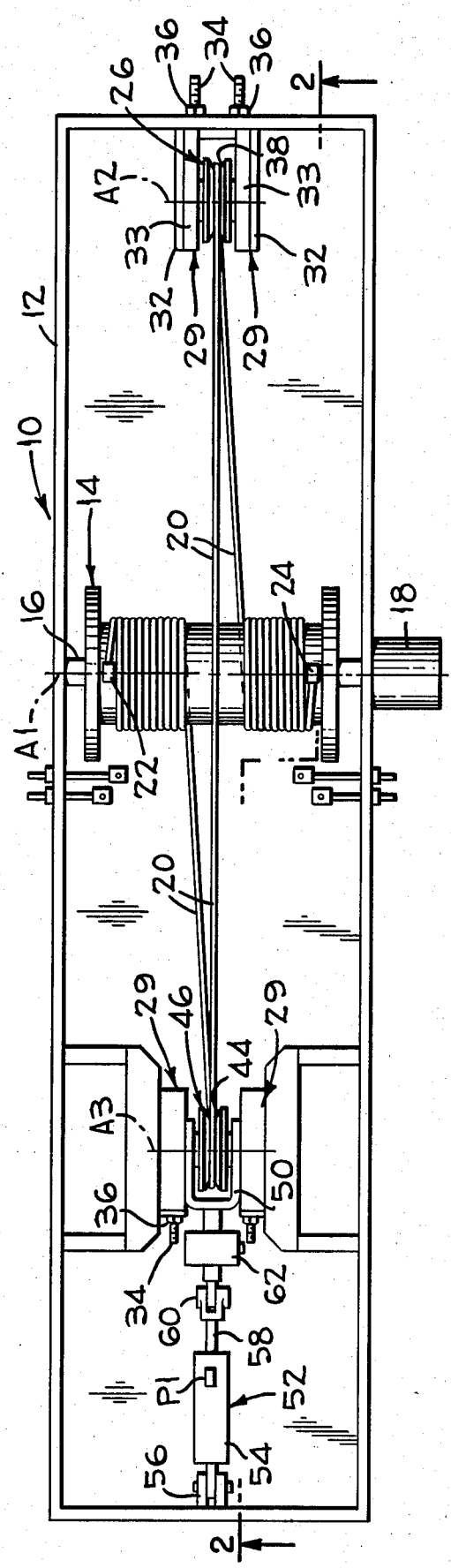
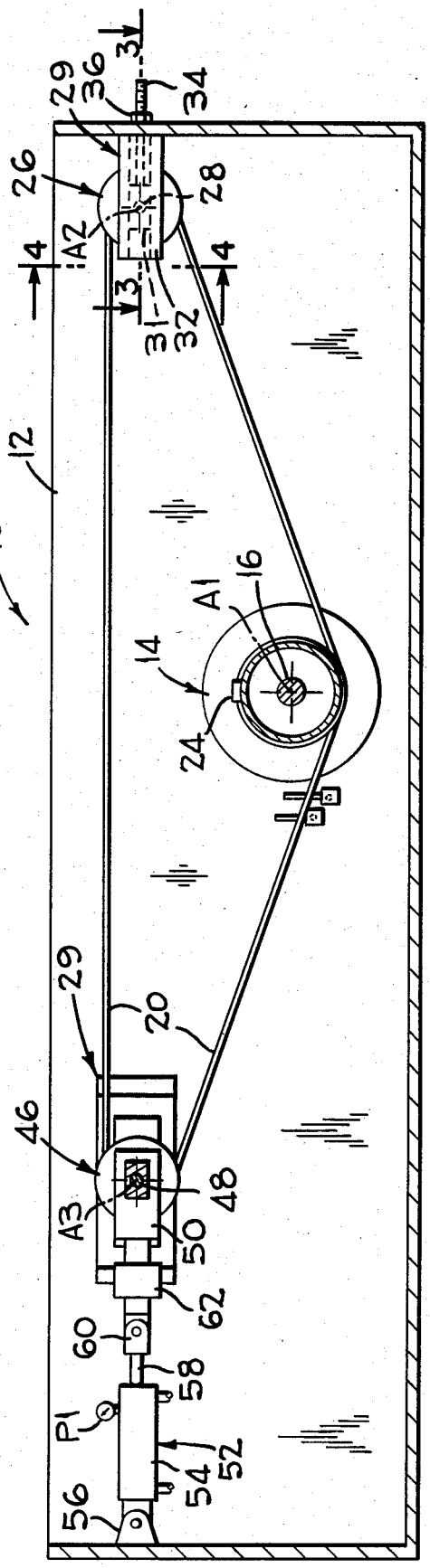
FIG_1
FIG_2

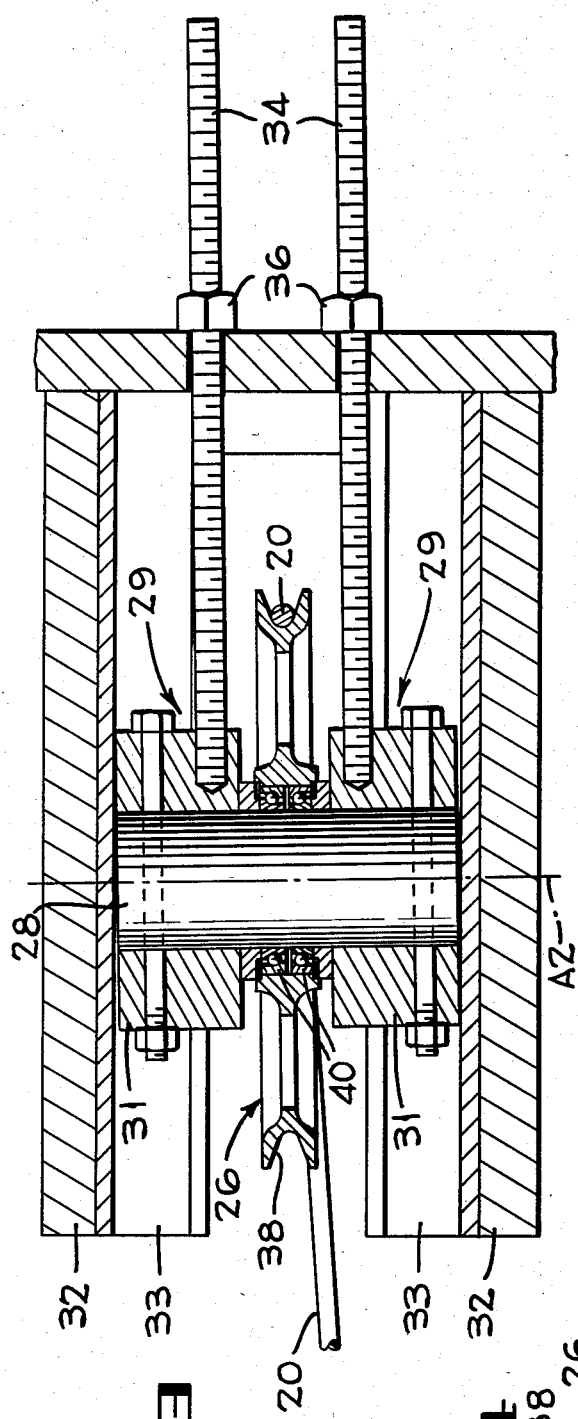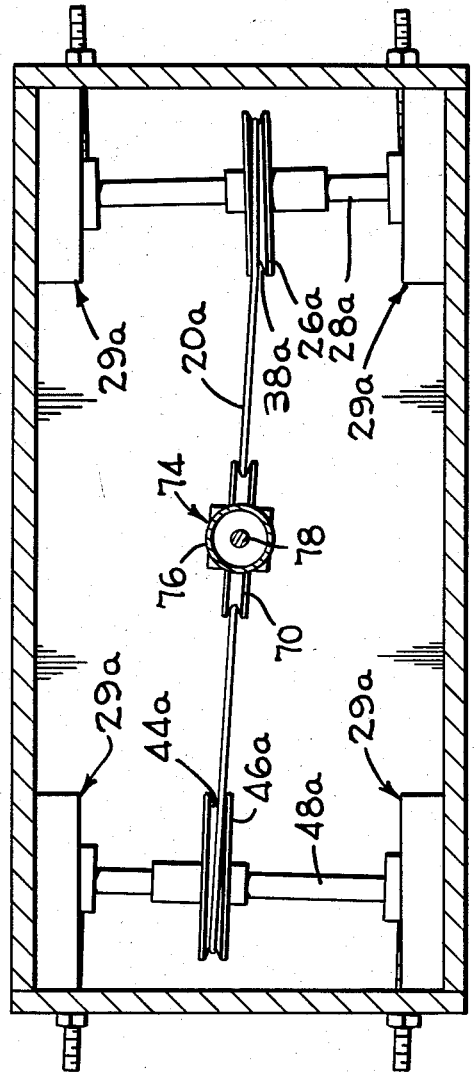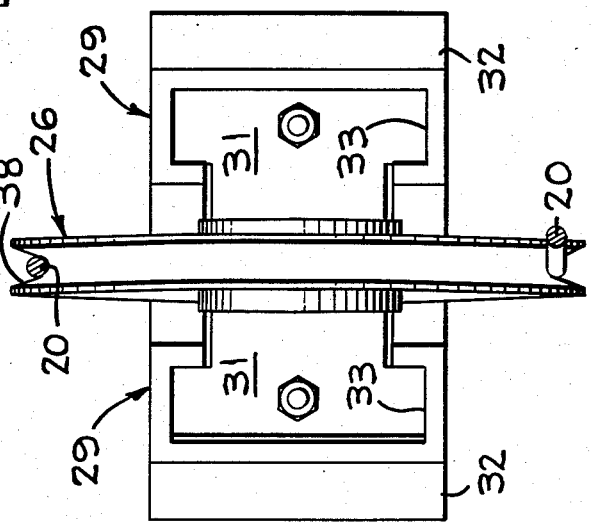

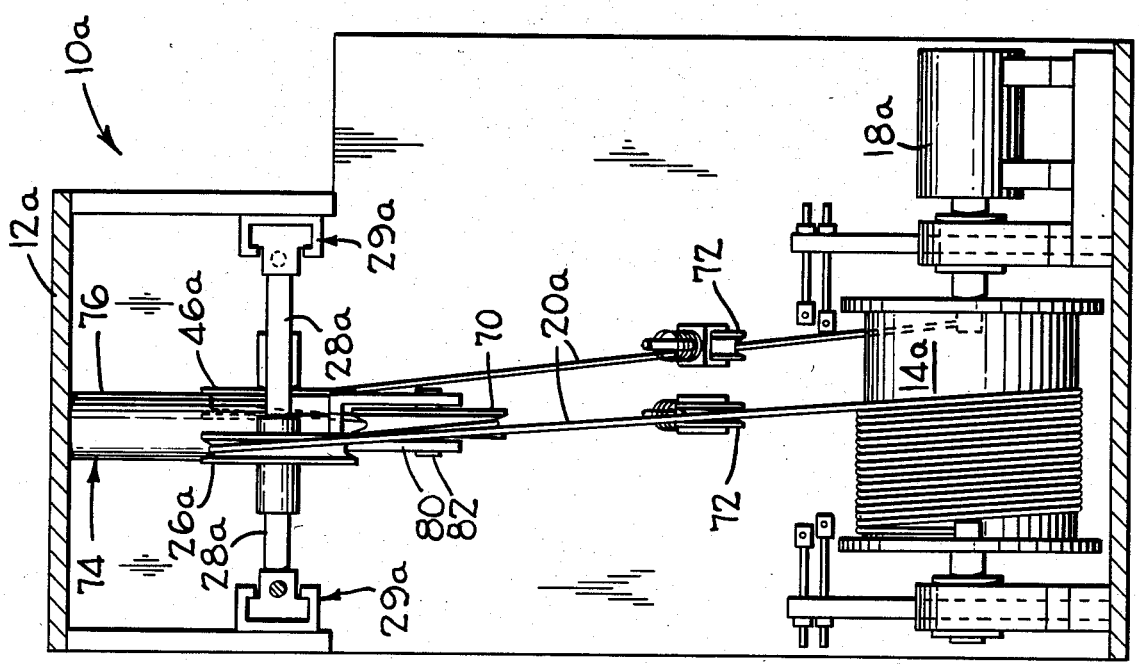
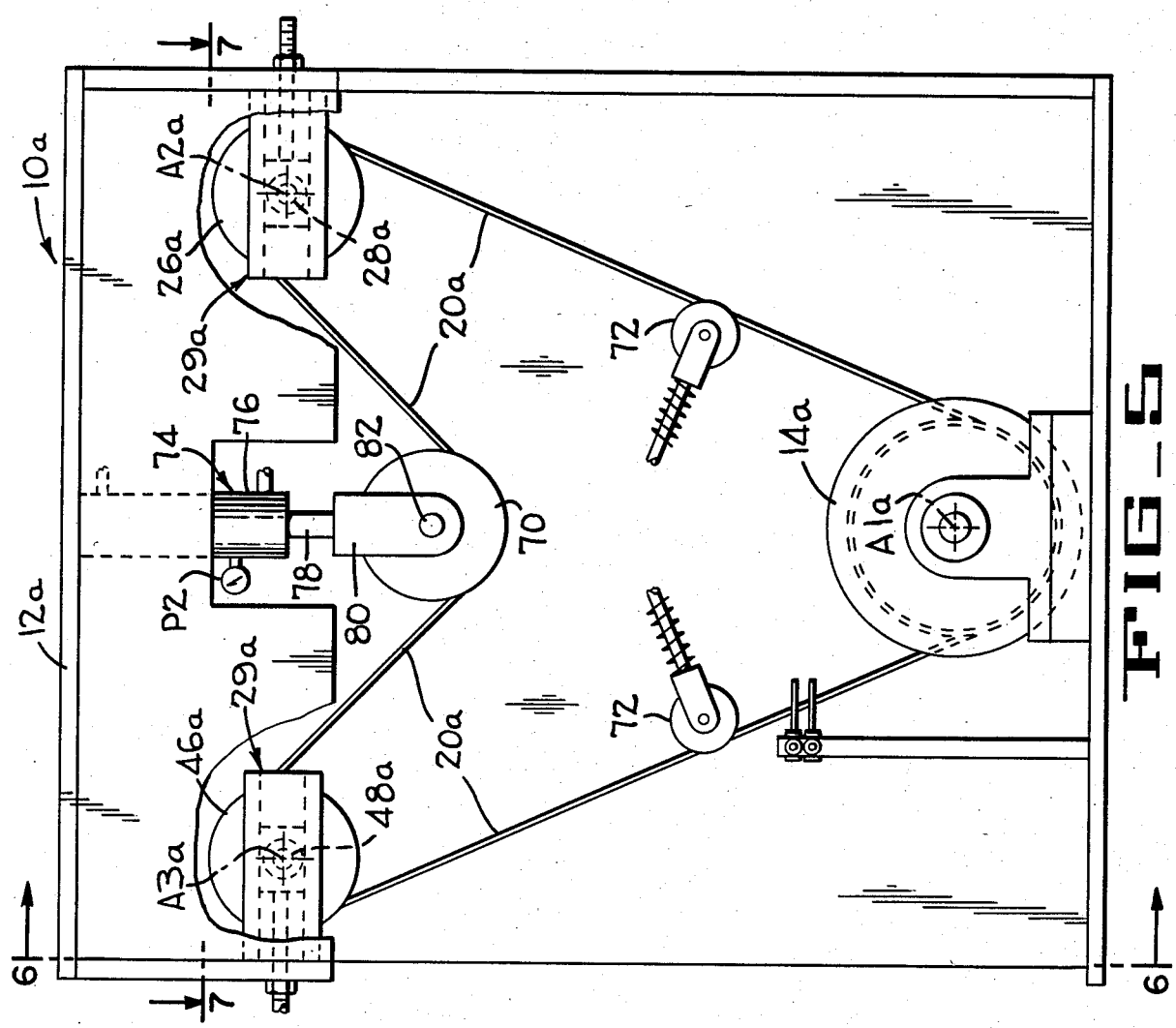

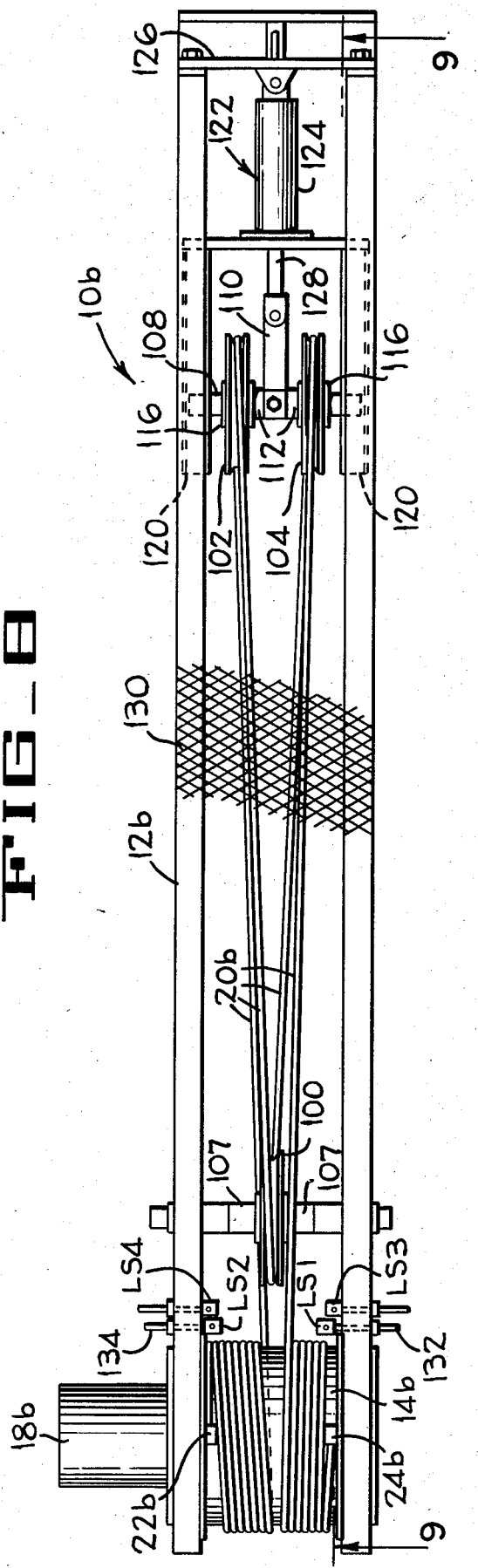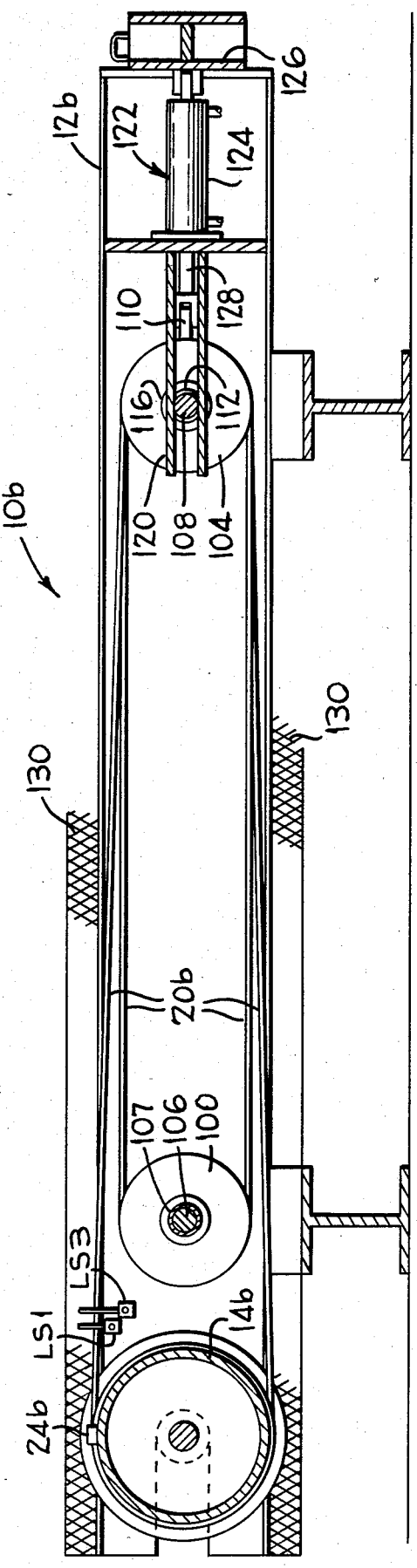

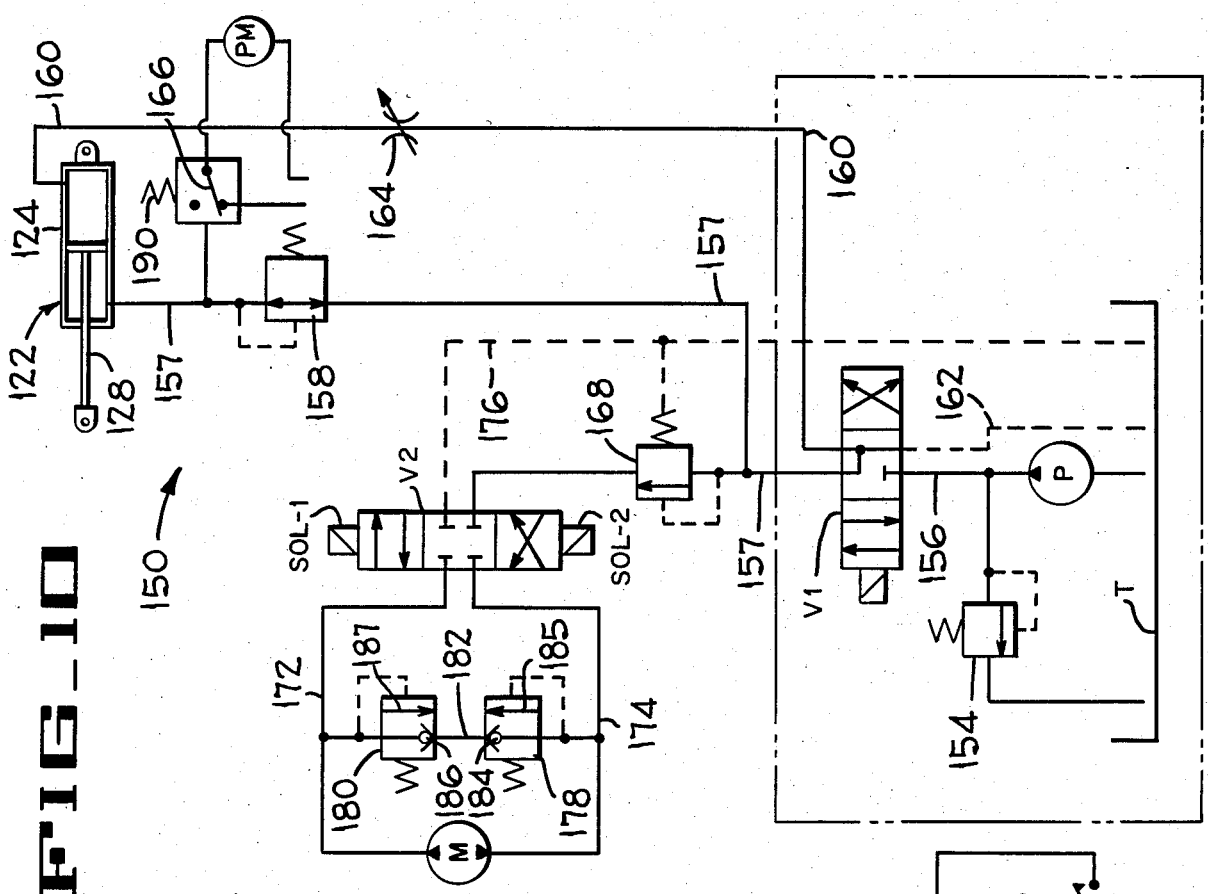
FIG_10
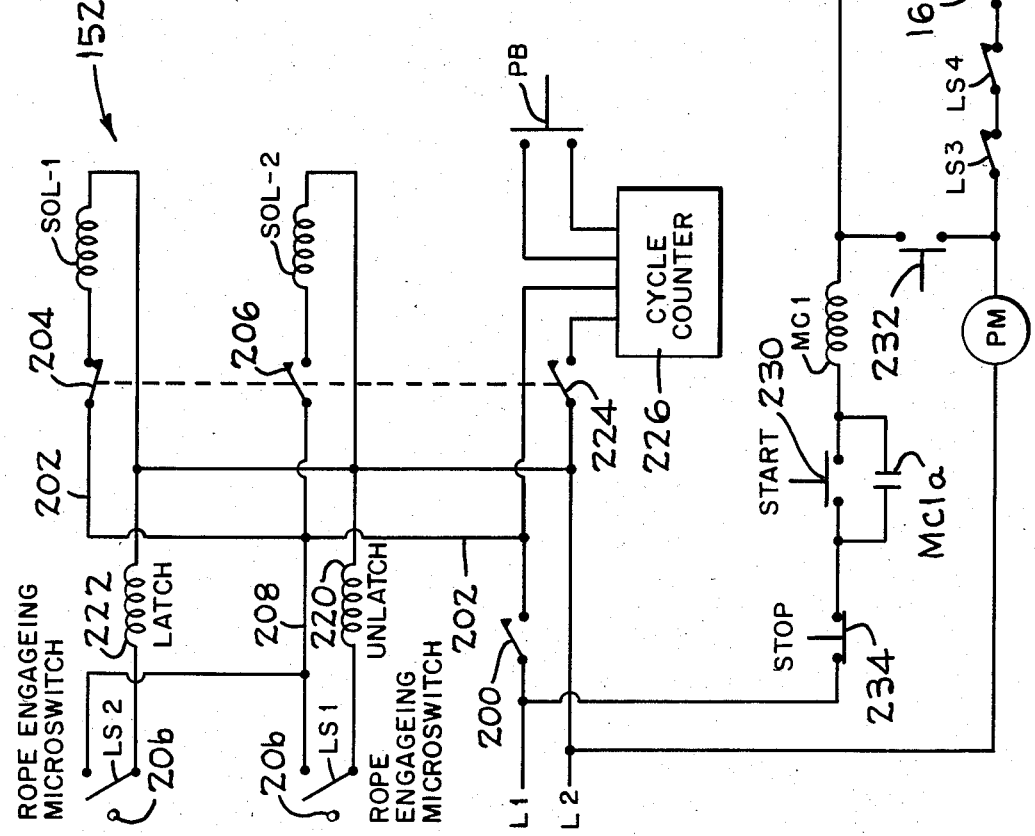
FIG_11

1

ROPE AND SHEAVE TESTING DEVICE AND METHOD

BACKGROUND OF THE INVENTION

Field of the Invention

The present invention pertains to a testing device and method for testing wire or non-metallic ropes and sheaves which device simulates actual operating conditions of a rope and sheaves when used in a crane or the like.

SUMMARY OF THE INVENTION

The present invention includes a winch drum and a plurality of test sheaves around which a rope is trained. Rope tensioning means is provided to apply desired tension forces to the rope and the drum is alternately driven in opposite directions during testing of the rope and of the sheaves. The wire rope and sheave testing device may be adjusted to vary rope tension, rope speed, sheave speed, and sheave off-lead angles relative to the rope, and in a second embodiment the device is capable of allowing reverse bending of the rope. The use of each device simulates actual field operating conditins of the rope and sheaves and is adaptable to various rope and sheave diameters. The winch drum provides for storage of rope which allows high rope velocities to be developed.

BRIEF DESCRIPTION OF THE DRAWINGS

FIG. 1 is a diagrammatic plan of a first embodiment of the invention with conventional drum spooling sheaves being removed.

FIG. 2 is a section taken along lines 2—2 of FIG. 1.

FIG. 3 is an enlarged horizontal section taken along lines 3—3 of FIG. 2.

FIG. 4 is an enlarged section looking in the direction of arrows 4—4 of FIG. 2.

FIG. 5 is a digrammatic side elevation of a second embodiment of the invention which includes a rope reversing sheave and illustrates fragments of the conventional drum spooling sheave.

FIG. 6 is a side elevation taken along lines 6—6 of FIG. 5.

FIG. 7 is an enlarged section taken along lines 7—7 of FIG. 5 with the lower portions of the testing device being omitted.

FIG. 8 is a diagrammatic plan of a third embodiment of the invention.

FIG. 9 is a section taken along lines 9—9 of FIG. 8.

FIG. 10 is an hydraulic diagram for the third embodiment of the invention and also useable in the other embodiments of the invention.

FIG. 11 is a wiring diagram illustrating the motor reversing circuit and a counter for the hydraulic circuit of FIG. 10.

DESCRIPTION OF THE PREFERRED EMBODIMENT

The wire rope and sheave testing device 10 (FIGS. 1 and 2) of the first embodiment of the invention comprises a frame 12 having a winch drum 14 mounted on a shaft 16 which is journaled in the frame 12. The shaft 16 has an axis of rotation A1 and is coupled to a variable speed, reversible motor 18, which may be a hydrostatic motor, that is mounted on the frame 12. A wire rope 20 to be tested has its end portions removably secured to the drum 14 by anchors 22, 24.

A first intermediate portion of the wire rope is trained over a first test sheve 26, which sheave is journaled on a shaft 28 that is connected to a pair of shaft adjustment mechanisms 29 that secured the shaft 28 in a single plane between two anchor brackets 32 welded to the frame. Each mechanism 29 includes an adjustable shaft mount 31 (FIGS. 2-4) that is slidably received in a slide 33 secured to the associated anchor brackets 32, and the shaft 28 is preferably bolted to the shaft mount. Each adjustable shaft mount 31 permits one end of the shaft 28 to be adjusted by a threaded rod 34 rigidly secured to the shaft mount 31 and extending through a hole in the frame. A nut 36 is screwed onto the rod to oppose the tensioning forces applied to the rope. The nut may be adjusted on one or both rods 34 to position the axis A2 of the test sheave 26 parallel to the drum axis A1 as shown in FIG. 1, or in a position that is angled a predetermined amount relative to the axis A1 of the drum for providing a desired off-lead of the rope receiving groove 38 of the sheave relative to the rope trained thereover as illustrated in FIGS. 2 and 3. The off-lead increases the frictional wear between the rope 20 and the sheave groove 38 and also applies a greater side force on the sheave bearings 40 (FIG. 3). Although the bearings are illustrated as being anti-friction bearings it will be understood that the test sheave 26 may be provided with other types of bearings, such as bronze bushings or the like.

A second intermediate portion of the rope 20 is trained around the groove 44 (FIG. 1) of a second test sheave 46 which is journaled on a shaft 48 secured to a U-shaped bracket 50 by a second adjustment mechanism 29 which permit adjustment of the axis A3 of the sheave 46 between a position parallel with the axis A1 of the drum, or at a small angle relative to the axis A1 to provide off-lead between the groove 44 and the rope portion trained thereover.

A hydraulic cylinder 52 has its cylinder case 54 pivotally connected to the frame 12 by a yoke 56, and has a connecting rod 58 pivotally connected to the U-shaped bracket 50 by a connecting linkage 60. A load cell 62 is included in the linkage 60 and provides one means for measuring the actual force applied to the cable 20. A pressure gauge P1 provides a second means which may be used to determine the force applied to the cable 20 as a function of the area. A conventional hydraulic pump valve assembly (not shown) may be manually or automatically operated for actuating the cylinder 52 at the desired pressure and to vary the rope tension during operation of the testing device 10. For example, a high force may be applied to the cable when the drum is rotated in one direction, and a low force may be applied to the cable when the drum is rotated in the opposite direction thus simulating forces acting on the rope of a crane when lifting a full concrete bucket and lowering an empty bucket.

In operation of the first embodiment of the testing apparatus and method of the present invention, test sheaves 26 and 46 are first mounted on shafts 28, 48, respectively, and the shafts are secured to associated shaft mounts 31 of the associated adjustment mechanisms 29. One end portion of the rope 20 is then trained over the sheave 26 and around sheave 46 and the adjacent free end is connected to the drum 14 by anchor 24. The motor 18 is then started to drive the drum in a clockwise direction (FIG. 2) thus winding substantially all of the rope on the drum 14. The other end of the rope is then wound under the drum and is connected to the drum by anchor 22, and the drum is then rotated in the same direction and the cylinder 52 is activated to take up slack in the rope.

If it is desired to provide an off-lead angle to one or both of the test sheaves 26,46, the operator adjusts the associated adjustment mechanism 29 screwing one or both nuts 36 on the threaded rod 34 in opposite directions to provide the appropriate angle to the shaft 28 and thus the desired off-lead. However, it will be understood that one or both shafts 26,46 may be adjusted to positions wherein the axes A2 and A3 of the test sheaves are parallel to the axis A1 of the drum 14.

The operator then applies the desired tension to the rope 20 by actuating a conventional hydraulic control system to be described hereinafter in regard to the third embodiment of the invention. The system directs hydraulic fluid from a conventional pump for applying force toward the left (FIGS. 1 and 2) thereby tensioning the cable 20. The testing device is then prepared for testing the rope 20 and/or the test sheaves.

The operator first actuates conventional manually operated or automatically operated motor controls (as will be described with the third embodiment) to first drive the drum 14 in a counterclockwise direction until substantially all of the rope adjacent the anchor 24 has been unwound from the drum, and then the direction of rotation of the drum is reversed until substantially all of the rope adjacent the anchor 22 is removed from the drum 14. Rotation of the drum in opposite directions, as above described, is repeated until the test is completed.

During the repeated rotation of the drum in opposite directions, the tension of the rope may be varied; for example, a high tension may be applied when the drum is rotating in a first direction, and a low tension may be applied when the drum is rotating in the opposite direction thereby simulating a crane lifting a loaded concrete bucket to the top of a tall building and thereafter lowering the empty bucket to the ground.

The speed of rotation of the drum may also be varied by conventional controls (not shown). In the above example, the full concrete bucket may be lifted at a slow rate, and the empty bucket may be rapidly lowered thus simulating actual stresses on the rope and wear on sheaves during use of a crane in the above example.

Thus, the testing device 10 may be operated to closely simulate actual wear on the sheave grooves, sheave bearings, and rope to determine the life of these components when used in the field.

It is apparent that conventional controls may be used to automatically control the speed and alternately change the direction of the motor 18 and drum 14; and that conventional automatic controls may be used to operate the hydraulic cylinder to alternately vary the tension of the rope. The above referred to conventional controls used to control the speed and alternate changes of direction of the motor 18 may be the same as that used on conventional wire rope cranes. The controls disclosed in assignee's Crawford et al U.S. Pat. No. 4,398,698 which issued on Aug. 16, 1983 could be used to control the motor 18 of the present invention. The Crawford patent is incorporated by reference herein. It is also apparent that metallic wire ropes, non-metallic ropes, non-metallic sheaves, and metallic sheaves may be tested by the apparatus. The test ropes are preferably between about 150-200 feet long with the test sheave spacing being about 8-10 feet. Speed of the rope may be within the range of about 50-400 feet per minute with an average speed of about 150 feet per minute. The force applied to the rope is a function of rope size and "safety" factor or strength margin. For a standard, steel, ¾" diameter wire rope the force might be in the 15,000 pounds range.

A second embodiment of the testing device 10a is illustrated in FIGS. 5-7 and is similar to the first embodiment except that the second embodiment adds a rope reversing sheave 70 to that of the first embodiment. Since many components of the second embodiment are similar to those of the first embodiment, only the differences between the second embodiment and first embodiment will be described in detail. Components of the second embodiment which are the same or equivalent to those of the first embodiment will be assigned the same numerals used in the first embodiment followed by the letter "a".

The testing device 10a comprises a frame 12a which rotatably supports a winch drum 14a driven by a variable speed, reversible motor 18a. A wire rope 20a to be tested is trained over the drum and has its opposite ends anchored to the drum. A first test sheave 26a and the second test sheave 46a are journaled on shafts 28a,48a, respectively, that are adjustably secured to the frame 12a by four adjustment mechanisms 29a. The adjustment mechanisms 29a permit the axes A2a and A3a (FIG. 5) of the shafts 28a and 48a to be positioned parallel to the axis A1a of winch drum 14a, or to be angled relative thereto to provide the desired off-lead of the test sheaves 26a,46a relative to the rope 20a for more effective testing of wear on the sheave grooves 38a,44a, the sheave bearings, and the rope. Conventional spring loaded drum spooling sheaves 72 are illustrated, and are used for the purpose of properly winding the rope 20a on the drum 14a and for unwinding the rope from the drum as is conventional in crane winch drums.

As best illustrated in FIG. 5, the test sheaves 26a,46a are spaced a considerable distance above the drum 14a and are disposed closer together than the equivalent test sheaves of the first embodiment of the invention. This difference in orientation of the sheaves 26a,46a enables the rope reversing sheave 70 to apply a relatively sharp reverse bend angle of approximately 90° to the rope 20a.

A hydraulic cylinder 74 is provided for applying tension to the rope and includes a cylinder case 76 rigidly secured to the frame 12a and a piston rod 78 having a yoke 80 on its lower end which receives a shaft 82 that rotatably supports the rope reversing sheave 70.

As in the first embodiment of the invention, the cylinder case 76 receives high pressure hydraulic fluid from a conventional pump and a manually or automatically operated valve (not shown), which valve may be actuated to increase or decrease the force applied to the cable 20a. A pressure gauge P2 provides a means which may be used to determine the reverse bending force and tension to the rope 20a as a function of the area of the piston (not shown) within the cylinder case 76.

The operation of the testing device 10a of the second embodiment is substantially the same as that of the first embodiment except that the rope is additionally subjected to a reverse bending force.

A third embodiment of the testing device 10b (FIGS. 8-11) is similar to the first embodiment except that three test sheaves 100,102 and 104 are provided. Since many of the components of the third embodiment are similar to those of the first embodiment, only the differences between the first and third embodiment will be described in detail. Components of the third embodiment which are similar or equivalent to those of the first embodiment will be assigned the same numerals used in the first embodiment followed by the letter "b".

The testing device 10b comprises a frame 12b which rotatably supports a winch drum 14b driven by a variable speed reversible motor 18b. A wire rope 20b to be tested is trained over the drum and has its opposite ends anchored to the drum at 22b,24b. The first test sheave 100 is journaled on a shaft 106 and is held in at the longitudinal center line of the frame by tubular spacers 107. The shaft 106 is removably secured to the frame 12b to permit removal and replacement of test sheaves. The sheave 100 is located immediately adjacent the drum 14b thereby reducing the overall length of the testing device 10b. The test sheaves 102 and 104 are rotatably received on a second shaft 108 and are spaced apart by a tongue 110 bolted to the shaft and by tubular spacers 112, and collars 116 positioned on the second shaft 108. It will be understood that spacers 112 of different lengths may be used to vary the spacing of the sheaves 102,104 from each other and from the longitudinal centerline of the frame 12b, if desired. The ends of the shaft 108 are slidably received in channel tracks 120 secured to the frame 12b. The rope 20b being tested has one end anchored to the drum 14b at 24b and is trained over the test sheave 104, under the test sheave 100 and over the test sheave 102 before returning under the drum 14b for anchoring at 22b. Expanded metal screening 130 is bolted to and covers substantially all of the exposed area of the testing device 10b during operation of the testing device to prevent operators from being injured by ruptured cables or sheaves. A hydraulic cylinder 122 has its cylinder case 124 anchored to a reinforced end wall 126 of the frame 12b and has its cylinder rod end 128 connected to the tongue 110.

In order to automatically change the direction of rotation of the drum 14b before the rope 20b unwinds from the ends of the drum, two inner limit switches LS1 and LS2 are mounted on rods 132,134 in position to sequentially engage the rope 20b and thus reverse the direction of rotation of the drum. The rods 132,134 are adjustably locked in sleeves in the frame and may be moved transversely of the longitudinal axis of the frame to change the position of the switches relative to the ends of the drum. A second pair of limit switches LS3,LS4 are mounted outwardly of the switches LS1,LS2 on rods connected to the frame as above described. Switches LS3,LS4 are closed during normal operation. If for some reason the drum would not change direction and switch LS3,LS4 were touched by the rope they would open thereby opening a circuit to motor PM which drives the pump P thereby stopping the pump and flow of fluid.

A hydraulic circuit 150 (FIG. 10) and an electrical circuit 152 (FIG. 11) are provided to control the operation of the testing device 10b. It will also be understood that similar hydraulic and electrical circuits may be used to operate the first and second embodiments of the invention.

The hydraulic circuit includes a pump P which receives fluid from a tank T and directs fluid to a valve V1. The valve V1 is illustrated as a solenoid valve operated by a toggle switch (not shown). It is understood that the valve V1 may be a mechanically operated valve if desired. A pilot operated relief valve 154 opens to return fluid to tank T if the pressure becomes excessive.

When valve V1 is in its parallel passage position fluid flows through conduit 156,157 through spring loaded pilot operated pressure reducing and relieving valve 158, and into the rod end of the cylinder 122 to apply the, desired tension to the rope 20b. Fluid in the case end of the cylinder 122 returns to tank T through conduit 160, a parallel passage in valve V1 and a conduit 162. An adjustable needle valve 164 in conduit 160 is used for manually extending or retracting cylinder 122 when replacing new rope 20b or sheaves. As the fluid pressure in the retract or rod end of the cylinder 122 reaches a predetermined value the pilot operated pressure reducing and relieving valve 158 closes reducing the pressure applied to the cylinder 122 and provides the reduced pressure to a pressure switch 166. Pressure switch 166 is used to shut the system down if a sheave or rope should fail. The higher pressure fluid in conduit 157 is then directed into a pilot operated sequence valve 168 which opens and directs the fluid to a drum reversing solenoid valve V2 which is illustrated in its centered closed position. Sequence valve 168 will always maintain pressure upstream so cylinder 122 always maintains a constant force.

The drum reversing solenoid valve V2 is alternately shifted from its illustrated closed neutral position to its cross passage and parallel passage positions as will be set forth when describing the electrical circuit 152.

When in the cross passage position high pressure fluid flows from conduit 157, through a cross passage in valve V2 through a conduit 172 to hydraulic motor M thereby driving the motor in one direction. Fluid discharged from the motor M flows through conduit 174, a cross passage in valve V2 and returns to tank through a conduit 176.

When the valve V2 is positioned in its parallel passage position, high pressure fluid flows from conduit 157, a parallel passage in valve V2, conduit 174 and drives the motor M in the opposite direction. Fluid from the motor M then returns to tank T through conduit 172, a parallel passage in valve V2 and conduit 176. The motor M is driven in forward and reverse directions until the test of the rope and/or sheaves is completed. The rope may be driven at rates between about 0 to 700 feet per minute with about 150 feet per minute being the average testing speed.

A pair of spring loaded, pilot operated port relief valves 178,180 (which are an integral part of the motor) are connected to the conduit 182 that is connected between conduits 172 and 174. Each port relief valve is normally closed by an associated check valve 184,186 to prevent flow through conduit 182. However, as the motor M is being accelerated up to full speed, or decelerated to zero speed, the pressure in the high pressure side of the motor will increase sufficiently to pilot the associated port relief valve 178,180 to a partially (or fully) open position thereby directing fluid through an associated parallel passage 185,187, respectively, and past the check valve in the other port relief valve to the low pressure side of the motor M. Thus, the port relief valves 178,180 provide a pressure cushion for the motor M each time the motor starts to drive the drum 14b in either of its two directions of rotation.

The pressure switch 166 is connected to the conduit 157 adjacent the cylinder 122 and is normally held open by a spring 190 when low pressure is present in the rod end of the cylinder 122. Under normal running conditions high pressure overcomes spring 190 and closes the pressure switch. In the event the rope being tested breaks, or for other reasons the pressure in the rod end of cylinder 122 is lost, the switch 166 opens thereby opening a circuit to motor PM which drives the pump P thereby stopping the pump and flow of fluid.

When the valve V1 is positioned in its cross passage position fluid flows through conduit 160, through the open needle valve 164 and into the case end of the cylinder 122b thereby relaxing the rope 22b. The fluid returns to tank T from the rod end of cylinder 122 through conduits 157 and cross passage in the valve V1 and conduit 162.

The electrical circuit 152 receives 115 volt AC power from main lines L1 and L2 upon closing a start-stop switch 200. Power then flows through line 202, closed switch 204, solenoid SOL-1 of valve V2 (FIG. 10) thus shifting the valve V2 to its parallel passage position and driving the motor M in a first direction. At this time a switch 206, which is ganged to switch 204, is held open. The motor M is driven in the first direction until the cable 20b contacts and momentarily closes microswitch LS1. Power then flows from line 202 through line 208, closed switch LS1, and unlatching coil 220 which closes switch 206 and opens switch 204 thus de-energizing solenoid SOL-1 and energizing solenoid SOL-2 shifting the valve V2 to its cross passage position driving the motor M in a second direction. When the rope 22b momentarily contacts the switch LS2, latch coil 222 is energized thereby returning the ganged switches 204,206 to the illustrated position which energize solenoid SOL-1 and de-energize solenoid SOL-2 of valve V2 causing the motor M to drive the drum 14b in the first direction. This procedure is repeated until the test is completed.

In order to count the cycles made by the drum 14b, each momentary energization of unlatching coil 220 will also momentarily close a switch 224 which is ganged with switches 204,206 and which activates a conventional cycle counter 226 to make an accurate count of the cycles. At the end of the test, the counter is cleared by closing a push button switch PB.

FIG. 11 also illustrates a portion of a conventional start switch 230 for the conventional three phase pump motor PM. To start the motor, a start by-pass switch 232 is held closed until pressure closes pressure switch 166, and the pressure switch 232 is hydraulically closed thereby energizing relay coil MC1 which closes holding contact MC1a across start switch 230. When hydraulic pressure builds up and closes pressure switch 166, start bypass switch 232 is opened and the motor PM continues to drive the rope 20b through the closed circuit until switch LS3,LS4 or pressure switch 166 opens thereby stopping the motor PM. The motor PM may, of course, be stopped by opening a stop switch 234.

The actual evaluation of the life of the rope and/or the life of the sheaves of the three embodiments is of course determined when the rope completely fails or when one of the test sheaves fails. It is, of course, recognized that tests of the sheaves may require the use of several ropes, and that failure may occur to the bearings, through breakage of the sheave grooves or ude to excessive frictional wear between the rope and the sheaves. Alternately, other indicia may be used to evaluate the useful life of sheaves and ropes such as meeting Government standards, detecting measurable fraying or reduction of the diameter of rope, or thinning of the walls of the sheave grooves due to frictional wear. Furthermore, the useful life of the rope or sheave may be determined as satisfactory based on the test pressure applied on the rope and the count of a cycle timer. It is, of course, understood that indicia for evaluating rope and/or sheave life may vary considerably depending upon whether the rope and sheave were metallic or non-metallic.

From the foregoing description it is apparent that the method and apparatus of the present invention is employed to test a rope and sheaves under conditions that closely resemble actual use of these components in the field. The first and third embodiments of the invention discloses a method and apparatus capable of varying rope tension, rope speed, sheave speed, and sheave off-lead angles relative to the rope; and the second embodiment includes all of the above variables and additionally includes testing the rope by reverse bending of the rope.

Although the best mode contemplated for carrying out the present invention has been herein shown and described, it will be apparent that modification and variation may be made without departing from what is regarded to be the subject matter of the invention.

What is claimed is:

1. A testing device for testing at least a rope; the combination comprising:
    means defining a single winch drum mounted for rotation about an axis;
    a rope having opposite end portions anchored to said drum with one end portion wound on said single winch drum in one direction and the other end portion wound on the winch drum in the opposite direction;
    a first sheave journaled for rotation about a first axis and receiving a first portion of said rope in a sheave groove;
    at least one second sheave journaled for rotation about a second sheave axis and receiving a second portion of said rope in a second sheave groove;
    means for applying a tensioning force on said rope and on said first and second sheaves; and
    power means connected to said drum for alternately and repeatedly driving said rope in opposite directions for evaluating the life of said rope.

2. An apparatus according to claim 1 wherein said rope, is a wire rope.

3. An apparatus according to claim 2 and additionally comprising means for angling the axes of said sheaves relative to the axis of said winch drum for determining sheave groove wear of said first and second sheave means due to off-lead.

4. An apparatus according to claim 1 wherein at least one of said sheaves is a test sheave, and wherein said test sheave is tested for wear.

5. An apparatus according to claim 1 wherein each sheave is a test sheave and each test sheave has a rope receiving sheave groove therein and is supported on a shaft by a bearing, and wherein the bearing is tested for life and said groove is tested for frictional wear.

6. An apparatus according to claim 5 and additionally comprising means for angling the axis of said test sheaves relative to the angle of said single winch drum axis to determine the sheave groove wear due to off-lead.

7. An apparatus according to claim 1 wherein said means for applying a tensioning force comprises a hydraulic cylinder having one end anchored in fixed position and having another end operatively connected to said second sheave for applying a rope tensioning force to said rope when actuated in a rope stretching direction.

8. An apparatus according to claim 7 and additionally comprising a frame, means for adjustably securing said first sheave to said frame for selectively adjusting the axis of rotation of said first sheave, second shaft adjustment means for securing said second sheave to said another end of said hydraulic cylinder and for selectively adjusting the axis of rotation of said second sheave, and guide means secured to said frame for guiding the movement of said second shaft adjustment means and said second sheave upon actuation of said hydraulic cylinder in said rope stretching direction and in a rope relaxing direction.

9. An apparatus according to claim 1 wherein said means for applying a tensioning force on said rope is a first power means comprising a hydraulic cylinder having one end anchored in fixed position and having another end, and additionally comprising a rope reversing sheave operatively connected on said other end of said cylinder, said rope reversing sheave when in operative engagement with said rope adapted to apply said rope tensioning force to said rope when actuated in a rope stretching direction and to apply a rope relaxing force when actuated in the opposite direction.

10. An apparatus according to claim 1 wherein said sheaves are metallic sheaves.

11. An apparatus according to claim 1 wherein said rope is metallic.

12. An apparatus according to claim 1 wherein said rope is non-metallic.

13. An apparatus according to claim 1 wherein said first and said at least one second sheaves are non-metallic sheaves.

14. An apparatus according to claim 1 and additionally comprising means for determining the tensioning force applied to said rope and said first and at least one second sheave during testing.

15. An apparatus according to claim 14 wherein said means for determining said force is a load cell and wherein said force may be a variable force.

16. An apparatus according to claim 1 and additionally comprising control means for sequentially reversing the direction of movement of said rope in response to switch means positioned to be engaged by said rope prior to the ends of said rope being unwound from said drum.

17. A testing device for testing at least a rope; the combination comprising:
   means defining a single winch drum mounted for rotation about an axis;
   a rope having opposite end portions anchored to said drum with one end portion wound on said single winch drum in one direction and the other end portion wound on the winch drum in the opposite direction;
   a first sheave journaled for rotation about a first axis and receiving a first portion of said rope in a sheave groove;
   at least one second sheave journaled for rotation about a second sheave axis and receiving a second portion of said rope in a second sheave groove;
   means for applying a tensioning force on said rope and on said first and second sheaves;
   power means connected to said drum for alternately and repeatedly driving said rope in opposite directions for evaluating the life of said rope;
   wherein the axis of said winch drum, said first axis and said second axis are parallel;
   wherein said first sheave have a plane of rotation;
   wherein said at least one second sheave comprises two second sheaves mounted for rotation about said second sheave axis; and
   means for spacing said two second sheaves from each other and from said plane of rotation of said first sheave for providing rope off-lead between said two second sheaves and said first sheave means for increasing sheave groove wear during testing.

18. An apparatus according to claim 17 wherein said two second sheaves are spaced equal distances from said plane of rotation of said first sheave.

19. An apparatus according to claim 18 and additionally comprising control means including switch means disposed in position to be engaged by said rope on each side of said plane of rotation, said switch means being responsive to reverse the direction of movement of said rope in response to said rope engaging said switch means.

20. A rope and sheave testing device for testing a rope and at least one test sheave for evaluating rope life and the life, wear, and bearing performance of a sheave; the combination comprising:
   means defining a single winch drum for rotation about an axis;
   a test rope having a length of between about 150–200 feet long and trained around said winch drum and having opposite ends anchored to said single drum;
   a first test sheave journaled for rotation about a first sheave axis and receiving a first portion of said rope in a sheave groove;
   a second sheave journaled for rotation about a second sheave axis and receiving a second portion of said rope in a sheave groove;
   first power means for applying a selectively variable tensioning force on said rope and on said first and second sheave means; and
   second power means connected to said drum for alternately and repeatedly driving said drum and rope in opposite directions for evaluating the life of said rope and said at least one test sheave, a major portion of said rope being wound on said single winch drum during operation for allowing the rope to be accelerated up to about 400 feet per minute during testing.

21. An apparatus according to claim 20 wherein said first power means comprises a hydraulic cylinder having one end anchored in fixed position and having another end, and additionally comprising a rope reversing sheave journaled on said other end of said cylinder, said rope reversing sheave when in operative engagement with said rope adapted to supply said rope tension force to said rope when acutated in a rope stretching direction and to apply a rope relaxing force when actuated in the opposite direction.

22. An apparatus according to claim 20 wherein the axis of said winch drum, said first axis and said second axis are parallel; wherein said first sheave has a plane of rotation; wherein said at least one second sheave comprises two second sheaves mounted for rotation about said second sheave axis, and means for spacing said two second sheaves from each other and from said plane of rotation of said first sheave for providing rope off-lead between said two second sheaves and said first sheave for increasing sheave wear during testing.

23. An apparatus according to claim 22 wherein said two second sheaves are spaced equal distances from said plane of rotation of said first sheave.

24. An apparatus according to claim 23 and additionally comprising control means including switch means disposed in position to be engaged by said rope on each side of said plane of rotation, said switch means being responsive to reverse the direction of rotation of said winch drum and rope in response to said rope engaging said switch means.

25. An apparatus according to claim 22 and additonally comprising control means for sequentially reversing the direction of rotation of said winch drum and the direction of movement of the rope in response to switch means positioned to be engaged by said rope prior to the ends of said rope being unwound from said drum.

26. A method of testing a rope and test sheaves, which rope has end portions secured to opposite end portions of a single winch drum with one end portion of the rope wound on said single winch drum in one direction and the other end portion of the rope wound on said single winch drum in the opposite direction, said rope being trained around grooves in at least two test sheaves, said drum and said test sheaves having axes of rotation; comprising the steps of:
applying a tensioning force to said rope;
alternately rotating said single drum in opposite directions for winding said rope from one end portion of said drum onto the other end portion and from said other end portion onto said one end portion; and
repeating said alternate rotating steps until said rope and test sheave life can be evaluated.

27. A method according to claim 26 and additionally comprising the step of varying rope tension during said alternately rotating step to simulate field operating conditions.

28. A method according to claim 26 and additionally including the step of varying the rope speed during said alternately rotating step to simulate field operating conditions, said rope speed being variable between about 0–400 feet per minute.

29. A method according to claim 26 and additionally including the step of adjusting the axes of rotation of both of said sheaves to a position out of parallel with the axis of said single drum for providing a desired off-lead for applying a larger amount of sheave groove wear, sheave bearing wear and fatigue in the sheaves being tested.

30. A method according to claim 26 and additionally comprising the step of applying a reverse bending force to said rope.

31. A method according to claim 26 and additionally comprising the steps of: varying rope tension during said alternate rotating step; varying the rope speed while alternately rotating said rope and
adjusting the axis of at least one of said test sheaves to a postion out of parallel with the axis of said drum for providing a desired off-lead for applying a larger amount of sheave groove wear, sheave bearing wear, and fatigue in the off-lead sheave being tested to simulate actual field operating conditions.

32. A method according to claim 31 and additionally comprising the step of applying a reverse bending force to said rope.

33. A method according to claim 26 wherein at least three test sheaves are provided with one sheave having a plane of rotation and being mounted for rotation about a first axis of rotation; and wherein two sheaves are mounted for rotation about a second axis of rotation: said method additionally comprising the steps of spacing said two sheaves away from each other and from said plane of rotation; and maintaining said first axis and second axis of rotation parallel to the axis of rotation of said drum for providing a desired off-lead for applying a larger amount of sheave groove wear, sheave bearing wear and fatigue in the sheaves being tested.

* * * * *